Patented July 29, 1941

2,251,225

UNITED STATES PATENT OFFICE 2,251,225

SYNTHETIC WAX COMPOSITION AND PROCESS OF PREPARING THE SAME

Charles Dangelmajer, Niagara Falls, N. Y., assignor to E. I. du Pont de Nemours & Company, Wilmington, Del., a corporation of Delaware No Drawing. Application April 8, 1938, Serial No. 200,929

7 Claims. (Cl. 106—33)

This invention relates, in general, to synthetic wax compositions and more particularly to methods and modifiers for improving their properties. Still more particularly, it is concerned with improvements in hydrogenated castor oil waxes.

The high cost and limited availability of natural waxes, as well as their variations in quality have resulted in extensive investigations with a view to the development of inexpensive, uniform substitutes having the desirable properties of high melting point, waxy consistency, general compatibility with other substances used in the technical applications of waxes, and necessary plasticity. The wax resulting from the catalytic hydrogenation of castor oil at relatively low temperatures, for example, below 200° C., possesses all of the above-mentioned characteristics save that of plasticity. It is an opalescent white wax, melting at 80-86° C., consisting essentially of 12-hydroxystearin, and while useful for many purposes, it is too brittle for some applications. For example, a film of the wax is so lacking in flexibility that it flakes off quite easily from surfaces to which it is applied.

Heretofore, various proposals have been made in attempting to overcome this deficiency. In U. S. Patent 2,027,389 it is suggested that common soap be incorporated as a softener, while U. S. 2,027,390 proposes the use of gums, resins and drying oils such as linseed or China-wood oil. Again, in U. S. 1,928,438, Schrauth has recommended the addition of aliphatic alcohols, ketones or esters, melting above 70° C., as well as naphthalene tetrachloride. None of the previously proposed softening and toughening agents have been entirely satisfactory, either because they impart undesirable properties to the finished wax, such as a low melting point and increased water absorption, or because of their high cost.

This invention has as a principal object the improvement of hydrogenated castor oil wax, and in connection therewith the further object of improving its adherence, toughness and elasticity. An additional object is to provide harmless, inexpensive plasticizing agents for hydrogenated castor oil wax.

These and other objects hereinafter apparent are accomplished according to this invention by combining hydrogenated castor oil, consisting essentially of 12-hydroxystearin, with at least one substance of the group consisting of unsaturated higher alcohols and lower cellulose ethers.

It has now been found that unsaturated higher alcohols, particularly abietyl alcohol, and lower cellulose ethers, especially the ethyl ether of cellulose, impart to hydrogenated castor oil wax a toughness, elasticity, and flexibility not heretofore attainable by any of the known modifying agents without, however, detracting from its inherently valuable properties. The products of the invention may be prepared in a simple manner either by mechanically mixing the plastifying agent with the hydrogenated castor oil wax, or more conveniently by melting the ingredients together until homogeneous. Upon cooling, a perfectly uniform product results which, without further treatment, is suitable for use. In the preferred process, the hydrogenated castor oil, melting point 80-86° C., is warmed until molten and the requisite amount of modifying agent added. The heating is continued at 100-125° C. and the mixture vigorously stirred until homogeneous. Thereupon, the product is slowly cooled until it solidifies.

The modifying agents of the invention, higher unsaturated alcohols and lower cellulose ethers, are unique in their toughening and plasticizing action, particularly in that the lowering of the melting point by virtue of the addition is very slight, even with relatively large proportions. A composition containing as high as 15% by weight of abietyl or ricinoleyl alcohol only lowers the melting point of the unmodified wax about 5-7° C., while 5% by weight lowers it only about 2-3° C. While higher unsaturated alcohols and lower cellulose ethers are compatible in all proportions with hydrogenated castor oil wax, giving tough, transparent, horny films in a 1:1 ratio by weight, such a large ratio of modifying agent is not, in general, preferable because of undesired loss of waxiness.

Likewise, compositions containing less than 5% by weight are not, in general, of any great utility, since the toughening action is not so pronounced. In the preferred embodiment of the invention, from 10-20% by weight of modifying agent, based on the finished product, is incorporated to give maximum toughness and flexibility with a high melting point.

As modifying agents of the class described may be mentioned among the unsaturated alcohols, abietyl, ricinoleyl, octadecenyl, erucyl and sebacyl alcohols. Similarly, unsaturated alcohols obtained by the carboxyl reduction of the unsaturated acids of naturally-occurring oils, such as peanut, perilla, oiticica, menhaden, olive, China-wood and rapeseed oils, are suitable. In general, unsaturated alcohols containing from 10 to 30 carbon atoms are useful in the practice of the invention.

As lower cellulose ethers which are equally useful for the practice of the invention may be mentioned methyl, ethyl, propyl, isopropyl and butyl cellulose. Ethyl cellulose is the preferred cellulose ether. Cellulose ethers may be used alone or in conjunction with unsaturated higher alcohols to modify the hydrogenated castor oil wax. For the purposes of the invention a lower cellulose ether is considered to be an ether of cellulose and an aliphatic alcohol containing less than five carbon atoms.

Having outlined above the general principles and purposes of the invention, the following exemplifications thereof are added for purposes of illustration but not by way of limitation.

Example I

Eighty-five parts by weight of hydrogenated castor oil, M. P. 83–85° C., was warmed until it became molten and then fifteen parts by weight of abietyl alcohol was added. The heating was continued at 100–125° C. and the mixture vigorously stirred until the solution became homogeneous. The blend was allowed to cool slowly and the product was obtained as an ivory-colored, tough, wax-like solid with a faint pinaceous odor. It melted at 77–80° C. and had an acid number of 2.3.

When 5 per cent by weight of abietyl alcohol was used in conjunction with hydrogenated castor oil, the product was an ivory-colored solid possessing some increased toughness. It melted at 81–83° C. and had an acid number of 1.34. Ethyl cellulose, when substituted for abietyl alcohol, gave a similar tough, tenacious product.

Example II

The process of Example I was repeated using ricinoleyl alcohol instead of abietyl alcohol. The resulting product was a practically colorless, hard, grainy, wax-like solid possessing a desirable toughness. It melted at 77–80° C.

A similar blend containing 5 per cent by weight of ricinoleyl alcohol melted at 81–83° C. and was somewhat tougher than the original hydrogenated oil.

Example III 20 grams of hydrogenated castor oil was melted with 40 grams of abietyl alcohol and 8 grams of ethyl cellulose. The resulting product was a translucent, elastic, sticky mass.

In the practice of the invention, I prefer to use castor oil hydrogenated to such an extent that the double bonds are substantially completely saturated. With substantially complete saturation, the iodine number is less than 10, and the hydrogenated oil consists essentially of 12-hydroxystearin.

Various other ingredients may be used to improve the properties of the synthetic wax. Acetals and esters of polyvinyl alcohol, rubber which has been isomerized by treatment with stannic chloride, and polymerized isobutylene having a molecular weight of about 14,000 enhance the valuable properties.

The products of the invention have many varied and valuable applications, such as the coating of paper, fruits, stencil sheets and other materials, for polishes, cleansing and preserving agents, in the manufacture of crayons, as dielectrics in the electrical field, and as leather finishes. They can be used as coating compositions for tin cans or other articles, and are especially suited for the "hot melt" process in which the molten coating is applied hot in absence of volatile solvent and hardens upon cooling.

Blends containing as high as 20% unsaturated alcohols or cellulose ethers may be prepared which have but a very slight effect on the melting point of the synthetic wax, and a remarkable toughening effect. Compositions containing from 1.0–50.0% unsaturated alcohols or cellulose ethers are useful. Preferably, I use 10.0–20.0% as the modifier.

It will be apparent that the invention provides novel and superior wax compositions containing, as a base material, hydrogenated castor oil.

The above description and examples are intended to be illustrative only. Any modification of or variation therefrom which conforms to the spirit of the invention is intended to be included within the scope of the claims.

I claim:

1. A homogeneous, wax product comprising more than 50% 12-hydroxystearin and a minor proportion of abietyl alcohol.

2. A synthetic wax composition comprising more than 50% by weight hydrogenated castor oil and from 5 to 30% by weight of abietyl alcohol.

3. A synthetic wax composition comprising more than 50% by weight hydrogenated castor oil and from 10 to 20% by weight of abietyl alcohol.

4. The process of plasticizing hydrogenated castor oil consisting essentially of 12-hydroxystearin, without greatly reducing its melting point, which comprises combining therewith 5–30% by weight of abietyl alcohol.

5. The process of plasticizing hydrogenated castor oil consisting essentially of 12-hydroxystearin which comprises heating about 85 parts by weight thereof until molten, adding thereto about 15 parts by weight of abietyl alcohol, further heating and stirring until the mixture becomes homogeneous, and cooling until the mixture solidifies.

6. The process of plasticizing hydrogenated castor oil consisting essentially of 12-hydroxystearin which comprises combining about 85 parts by weight thereof with about 15 parts by weight of abietyl alcohol.

7. A homogeneous, tough synthetic wax product consisting of a major proportion of hydrogenated castor oil and a minor proportion of abietyl alcohol.

CHARLES DANGELMAJER.